US009204402B2

(12) United States Patent
Thomas et al.

(10) Patent No.: US 9,204,402 B2
(45) Date of Patent: Dec. 1, 2015

(54) METHODS AND APPARATUS FOR LOCATION-BASED PARAMETRIC CONTROL (71) Applicant: Apple Inc., Cupertino, CA (US)

(72) Inventors: Tito Thomas, Cupertino, CA (US);
Kapil Chhabra, Cupertino, CA (US);
Vinesh Pallen, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 43 days.

(21) Appl. No.: 13/857,601

(22) Filed: Apr. 5, 2013

(65) Prior Publication Data

US 2013/0303232 A1     Nov. 14, 2013

Related U.S. Application Data (60) Provisional application No. 61/621,410, filed on Apr. 6, 2012.

(51) Int. Cl.
*H04W 52/28* (2009.01)
*H04W 64/00* (2009.01)
*H04W 52/14* (2009.01)

(52) U.S. Cl.
CPC .......... *H04W 52/283* (2013.01); *H04W 52/146* (2013.01); *H04W 64/003* (2013.01)

(58) Field of Classification Search
CPC ............ H04W 52/283; H04W 64/003; H04W 52/146
USPC ........................ 455/550.1, 456.1–456.6, 522; 342/357.1, 357.12
See application file for complete search history.

(56) References Cited

U.S. PATENT DOCUMENTS

| | | | |
|---|---|---|---|
| 5,940,743 A * | 8/1999 | Sunay et al. | .................... 455/69 |
| 6,263,205 B1 * | 7/2001 | Yamaura et al. | .............. 455/442 |
| 6,664,888 B1 | 12/2003 | Bishop | |
| 6,690,940 B1 | 2/2004 | Brown et al. | |
| 6,753,842 B1 | 6/2004 | Williams et al. | |
| 6,823,199 B2 | 11/2004 | Gough | |

(Continued)

FOREIGN PATENT DOCUMENTS

| | | |
|---|---|---|
| WO | WO 2006044931 | 4/2006 |
| WO | WO 2010117998 | 10/2010 |
| WO | WO 2012005460 | 1/2012 |

OTHER PUBLICATIONS

IEEE Std. 802.11 (1999 Edition) entitled "Part 11: Wireless LAN Medium Access Control (MAC) and Physical Layer (PHY) Specifications", 96 pages.

(Continued)

*Primary Examiner* — Brandon Miller
(74) *Attorney, Agent, or Firm* — Gazdzinski & Associates, PC (57) ABSTRACT

Methods and apparatus for location-based control of parameters such as radio frequency (RF) transmission characteristics of a wireless device. In one embodiment, a determination of a maximum allowable level for a given characteristic associated with the location of the wireless device is made, and the transmission characteristic of the wireless device is adjusted based at least in part on this maximum allowable level. The location may correspond to a regulatory domain with specific requirements for wireless transmitters. A database is referenced to retrieve these requirements. The maximum allowable levels are derived from the requirements. Thus, exemplary wireless devices are capable of universal regulatory compliance.

20 Claims, 6 Drawing Sheets

(56) References Cited

U.S. PATENT DOCUMENTS

| | | |
|---|---|---|
| 6,839,552 B1 | 1/2005 | Martin |
| 6,897,762 B2 | 5/2005 | Howells |
| 6,983,888 B2 | 1/2006 | Weng |
| 7,006,793 B2 | 2/2006 | Himmel et al. |
| 7,080,405 B2 | 7/2006 | Himmel et al. |
| 7,107,349 B2 | 9/2006 | Britt, Jr. |
| 7,783,307 B2 | 8/2010 | Hovestadt |
| 8,145,234 B1 | 3/2012 | Leonard |
| 8,190,083 B2* | 5/2012 | Wu et al. ............ 455/7 |
| 8,254,902 B2 | 8/2012 | Bell |
| 8,594,695 B2* | 11/2013 | Dunn ............ 455/456.1 |
| 2004/0120286 A1* | 6/2004 | Schwarz ............ 370/331 |
| 2004/0253963 A1 | 12/2004 | Park et al. |
| 2005/0146460 A1* | 7/2005 | Westerberg ............ 342/357.1 |
| 2005/0181808 A1 | 8/2005 | Vaudreuil |
| 2006/0160562 A1 | 7/2006 | Davis et al. |
| 2008/0019317 A1 | 1/2008 | Vellanki et al. |
| 2009/0176454 A1 | 7/2009 | Chen |
| 2009/0180430 A1 | 7/2009 | Fadell |
| 2009/0322890 A1 | 12/2009 | Bocking et al. |
| 2010/0093354 A1* | 4/2010 | Agashe et al. ............ 455/436 |
| 2010/0317302 A1* | 12/2010 | Greenwood et al. ....... 455/127.1 |
| 2011/0032902 A1* | 2/2011 | Kim ............ 370/331 |
| 2011/0087639 A1* | 4/2011 | Gurney ............ 707/690 |
| 2011/0165892 A1 | 7/2011 | Ristich |
| 2012/0329479 A1* | 12/2012 | Wirola et al. ............ 455/456.1 |

OTHER PUBLICATIONS

Specification of the Bluetooth System—Wireless connections made easy—Master Table of Contents & Compliance, Requirements—Covered Core Package version: 1.2 issued Nov. 5, 2003, 1200 pages.

* cited by examiner

METHODS AND APPARATUS FOR LOCATION-BASED PARAMETRIC CONTROL

PRIORITY AND RELATED APPLICATIONS

This application claims priority to U.S. Provisional Patent Application Ser. No. 61/621,410 of the same title, filed Apr. 6, 2012, the forgoing being incorporated herein by reference in its entirety.

This application is also related to co-owned, co-pending U.S. patent application Ser. No. 12/215,592 filed on Jun. 26, 2008 and entitled "APPARATUS AND METHODS FOR ENFORCEMENT OF POLICIES UPON A WIRELESS DEVICE", the forgoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless devices. More particularly, in one exemplary embodiment, the present disclosure is directed to controlling parameters such as the transmit power of a wireless device.

2. Description of Related Technology

Modern wireless devices such as smartphones and tablet computers are highly sophisticated devices which may employ many different air interfaces; e.g., cellular (such as LTE, CDMA, GSM, etc.), WLAN (e.g., Wi-Fi), PAN (e.g., Bluetooth), as well as other complex functions such as media streaming, multi-touch display and input devices, speech recognition, etc. Some of these functions can be location-specific in nature, such that certain limitations, rules, restrictions, or modes must be employed in certain geographic areas.

For example, in the specific case of radio frequency (RF) transmitters, such transmitters are regulated by local regulatory domains to ensure efficient use of wireless spectra, and to control the level of interference any one wireless application creates for other applications. These regulatory domains may include a part of a country or state or territory, a single country, or may even include multiple countries. Two major tools for implementing such regulations are (i) licensing, and (ii) limiting unlicensed use of wireless spectra. For licensed usage, a regulatory domain provides specific limits for the license holder that may detail every aspect of transmission (e.g. allowed power, frequency, channel number, channel spacing, channel hopping rate/sequence, power spectrum, digital/analog transmission, coding scheme, etc.). For unlicensed usage, regulatory domains provide general guidelines that apply to all users. Generally, specific frequency bands are set aside for unlicensed use. Although in many cases any user may use such bands freely, limits (e.g. maximum allowed power, allowed channels, etc.) are set forth to mitigate effects of activity by any one user on the activity of another.

The aforementioned limitations may change from one regulatory domain to another. In some cases, the frequency bands reserved for unlicensed usage may change from one regulatory domain to another. Further, even if the reserved unlicensed usage frequency remains constant from one regulatory domain to another, the particular limitations (such as the maximum transmit power or spectral masks allowed) may still change. Licensed usage is specifically controlled by each regulatory domain, and consequently, limitations associated with licensed wireless usage may also change between regulatory domains. As used herein, the term "spectral mask" (also known as a "channel mask" or "transmission mask") refers to a mathematically-defined mask that defines transmission power as a function of frequency (or increment thereof).

To avoid violating these regulations, wireless manufacturers wishing to create devices complaint with all or multiple regulatory domains must design their devices to comply with the strictest regulations of any of the domains in question. For example, in a group of ten regulatory domains, a first one may limit power transmitted by a device to a level that is 3 dB lower than the other nine. In this case, a device compliant with all ten regulatory domains would transmit at a power 3 dB lower than required in nine of those regulatory domains. In this same example, if a second one of the ten domains limits channel usage to two channels where the other nine allow three channels, compliance with all domains would require more strict regulations than would be present in any one of the ten domains.

Situations of conflicting regulations between two regulatory domains may also result. In these situations, it may be impossible to create a device compliant with both domains simultaneously. Accordingly, vendors create hardware that may only comply with a single regulatory domain (or a limited number). Consumers, transporting this domain-specific hardware to regions where it is non-compliant may be unaware they are violating local regulations. Further, they may unwittingly interfere with local legal spectrum usage. In addition, end-users may experience lower product satisfaction if they find that hardware purchased across multiple domains is not interoperable (or mistakenly identified as completely inoperable). Consequently, manufacturers are also required to make multiple versions of the same device (or related devices) to participate in global markets. This may lead to increased product overhead.

Hence, the current use of fixed methods of multiple regulatory domain compliance are inefficient, and, inter alia, do not take full advantage of permitted spectrum usage in all regulatory domains. Ideally, a device would be capable of selective control of its parameters (such as those relating to spectral emissions) and universal regulatory compliance, without need to meet the limitations from all domains simultaneously.

SUMMARY

The present disclosure provides, inter alia, improved apparatus and methods for controlling one or more parameters (such as the transmit power) of a wireless device using location-based services.

A method for controlling an operational parameter of a wireless device is disclosed. In one embodiment, the method includes: determining a location of the wireless device; determining a permissible value of a parameter, the permissible value associated with the location of the wireless apparatus, where the parameter includes a transmit power; adjusting the parameter of the wireless device based at least in part the determined value; determining a location of the wireless device using a location apparatus; determining a maximum allowed transmit power associated with the location of the wireless apparatus; and adjusting the transmit power of the wireless device based at least in part the determined maximum allowed power.

In one variant, the determining the location includes using a wireless receiver indigenous to the wireless device to determine the location. In one such example, the wireless receiver includes a WLAN-enabled receiver, and the determining the location includes determining based on association of the wireless device with a known location of an access point or hotspot. In another such example, the wireless receiver includes a satellite receiver. In still other examples, the determining the permissible value includes accessing a data structure of the wireless device containing information on permissible values of the parameter. Alternately, the determining the permissible value includes accessing a network server in data communication with the wireless device via a long term evolution (LTE)-compliant air interface.

In another variant, the foregoing method is performed automatically by the wireless device upon handover from one base station of a wireless network with which the device is in communication to another base station. In some cases, the handover to another base station includes a handover to a base station of a network operated by a different network operator.

A wireless device is disclosed. In one embodiment, the wireless device includes: a processor; a wireless interface in data communication with the processor; a storage apparatus in data communication with the processor and configured to store a data library including a plurality of spectral masks; a location apparatus in data communication with the processor and configured to determine a location of the wireless device; and logic in communication with the interface and configured to adjust at least one transmit characteristic of the wireless interface based at least in part on a spectral mask associated with the location of the wireless device.

In one variant, the at least one transmit characteristic includes one or more frequency bands of transmission. For example, in one such case, the at least one transmit characteristic is transmission power.

In another variant, the wireless device further includes: event detection logic, the event detection logic configured to: dynamically identify the occurrence of one or more events which are prospectively associated with a change in the location of the wireless device; determine the current location of the wireless device; determine based on the current location whether the wireless device should implement a new spectral mask; and when it is determined that a new spectral mask is required, invoke the logic in communication with the interface and configured to adjust at least one transmit characteristic in accordance with the new spectral mask.

Another wireless device is disclosed. In one embodiment, the wireless device includes: a processor; a wireless interface in data communication with the processor; a storage apparatus in data communication with the processor and configured to store a data library including a plurality of data elements indicative of geographic location; apparatus in data communication with the processor and configured to determine a location-related data element; and logic in communication with the interface and configured to adjust at least one transmit characteristic of the wireless interface based at least in part on the location-related data element.

In one variant, the location-related element is obtained from a transmission received from a base station of a wireless network with which the wireless device is in data communication, and the location-related data element includes a mobile network code (MNC).

In other variants, the location-related element includes a mobile country code (MCC). In some cases, the location-related data element includes a current location of the wireless device that has been determined by an entity other than the wireless device.

A non-transitory computer-readable storage apparatus including a storage medium having at least one computer program stored thereon is disclosed. In one embodiment, the at least one program is configured to, when executed, cause a processor to: adjust at least one transmit characteristic of a wireless interface of a wireless mobile device based at least in part on a spectral mask associated with a location of the wireless mobile device.

In one variant, the at least one transmit characteristic includes a transmit power.

In other variants, the location of the wireless mobile device is obtained from a transmission received from a base station of a wireless network with which the wireless mobile device is in data communication. In yet other cases, the location of the wireless mobile device is obtained from a global positioning system (GPS) receiver of the wireless mobile device.

Other features and advantages of the present disclosure will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.

Overview

In one exemplary embodiment, techniques for identifying the regulatory domain in which a given wireless device is currently located, and adjusting the settings of the wireless device to comply with the rules of the regulatory domain, are disclosed.

In one implementation, the location of a wireless device is determined using a location apparatus. The location is then used to determine the maximum allowed transmit power. The wireless device then adjusts its transmission settings accordingly. Thus, such exemplary wireless devices need not comply with unduly strict transmission requirements to achieve compliance with multiple regulatory domains.

One significant advantage of the present disclosure is that a wireless device may utilize the full range of permitted transmission characteristics for any one regulatory domain while still being capable of compliance with all others. This increases the performance of the device, in that it may leverage higher transmit powers on a wider set of frequency bands and channels than would be possible for a "fixed" multi-complaint device such as those of the prior art. This is because a strict regulation in a given regulatory domain must be applied in all domains for a fixed device; in contrast, exemplary implementations of the present disclosure only apply the regulations in the regulatory domain in which they are actually required.

Thus, a multi-compliant device, as described herein, has a greater ability to adjust its various parametric (e.g., radio frequency transmission) characteristics to avoid performance degradation. For example, the wireless device may be able to use an increased number of channels or frequency bands, and further, the device may be able to transmit at a higher power on those bands or channels.

DETAILED DESCRIPTION OF EXEMPLARY EMBODIMENTS

Exemplary embodiments of the present disclosure are now described in detail. While these embodiments are primarily discussed in the context of a wireless device and associated network such as for example and without limitation a WLAN (e.g., Wi-Fi) network, WiMAX (802.16), or cellular network (e.g., Long Term Evolution (LTE), Code Division Multiple Access 1X (CDMA 1X), GSM, or UMTS, TD-LTE (Time-Division Long-Term Evolution), TD-LTE-Advanced, TD-SCDMA (Time Division Synchronous Code Division Multiple Access)), it will be recognized by those of ordinary skill that the present disclosure is not so limited, and can be used with other wireless technologies. In fact, the various principles described herein are useful in combination with any network (cellular, wireless, wireline, or otherwise) that can benefit from location-based parameter management.
Methods—

The following discussion provides generalized methods for controlling one or more operating parameters (e.g., the RF transmission characteristics) of a wireless device using location information. In one implementation the method involves determining a maximum allowable level for a given characteristic associated with the location of the wireless device and adjusting the transmission characteristic of the wireless device based at least in part on this maximum allowable level.

Figure 1:
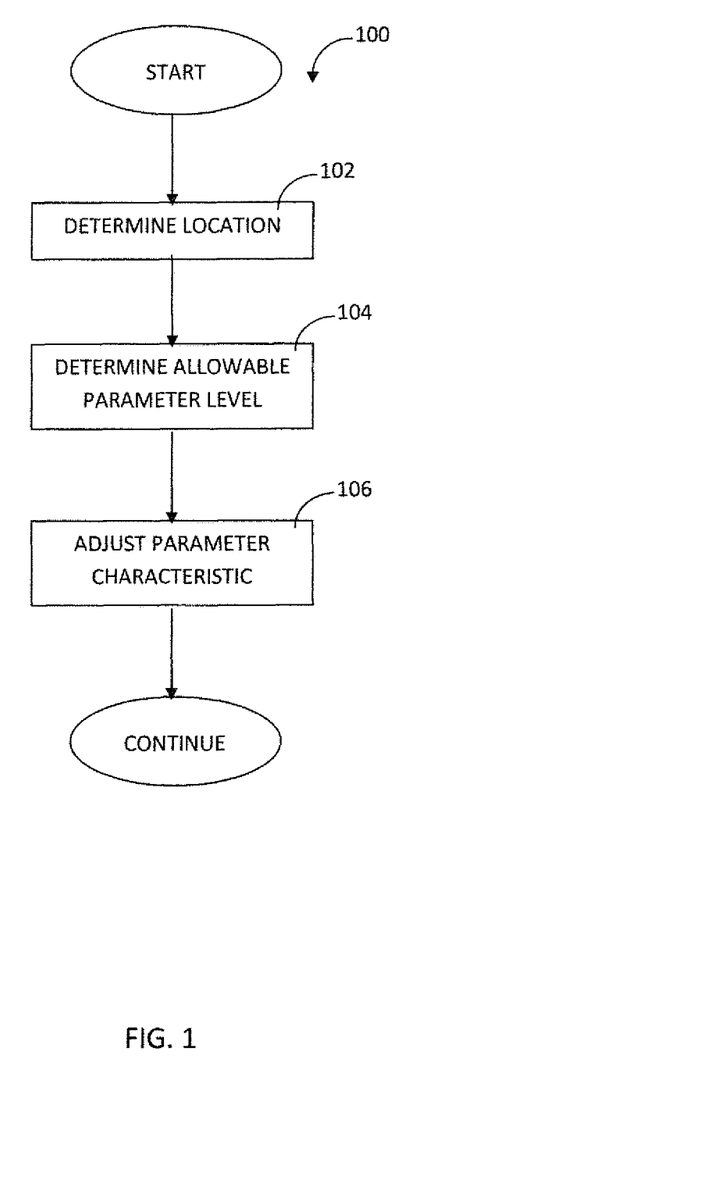
FIG. 1 is a logical flow diagram depicting an exemplary embodiment of a generalized method for location-based transmission characteristic control consistent with the present disclosure.

Referring now to FIG. 1, one embodiment of a generalized method 100 for controlling one or more parameters or characteristics of a wireless device based on a location is shown and described.

At step 102, the location of the location of the wireless device is determined. In one embodiment, this determination utilizes an automated location based service (e.g. satellite-based (such as GPS, GLONASS, Compass, Galileo, etc.), Wi-Fi-based, A-GPS, IP-based, cellular network based, triangulation, etc.) to determine the location of the wireless device. For example, a Wi-Fi-based device may contact a database server containing location information on Wi-Fi base stations or APs. These databases accept MAC addresses of Wi-Fi base stations as input and provide the location information based on a cataloging of Wi-Fi signals (and their associated locations) done by a third party. Mere association with a given AP can be indicative of location as well.

In the case of cellular-network-based variants, a cellular device's location may be estimated using the base station to which it is connected. The ID number (or country/region ID) of the base station identifies the base station (or region). The base station has a well known location, and the cellular device must be at least in range of the base station to connect to it. Thus, in this case, a rough estimate of the device's location may be made. Moreover, indigenous mechanisms within the infrastructure of the network (e.g., invocation of a handover procedure, indicating a locus of points which the mobile device must reside within) can be used for a rough approximation or range of location.

In other implementations, location information may be passed from one wireless device directly to another in a peer-to-peer (P2P) link. Thus, a location that is identified for one device may be passed to other devices in range of it, such as via the Wi-Fi or PAN (e.g., Bluetooth) interfaces of the devices. Devices lacking onboard location services may be located in this fashion.

In some variants, the length of the P2P chain may be limited. This may mitigate problems that arise from incidental P2P links extending beyond a domain boundary (e.g., a 100 device chain extending many kilometers, wherein only one of the devices had a positive location determination). Thus, the number of "second hand" location determinations that are "chained" is limited in some cases.

In other embodiments, the wireless device may be configured to prompt the user to provide location information to the device to assist in the location determination, or to serve as the sole basis for the location determination. For example, the user may enter a street address, well known entity or structure (e.g., Empire State Building), city/town, zip code, telephonic area code, or other information which can be used by the device (whether locally, or via connection to a remote entity such as a server) to determine location within a suitable degree of accuracy.

It will also be appreciated that imprecise or general location information may also be useful in certain applications. For example, a regulatory domain or given spectral mask may be associated with an entire country. Mere knowledge that one is located in that country may be sufficient to select and implement an appropriate mask, since (in this example) the same regulations and limits apply uniformly throughout that country. This is especially true of, for instance, and island, that has no contiguous neighboring countries, and hence no real opportunity for "border crossing". Where two countries are contiguous and share a common policy or mask, mere knowledge that the mobile device is located in either country is sufficient.

Allowed levels for the parameter (e.g., radio frequency transmission) characteristics of the device are then determined (step 104). In one embodiment, the wireless (e.g., mobile) device accesses internal data (such as that stored in a database, library, or other data structure or repository) to cross-reference the determined location of step 102 with a parametric rule set, limitation, or "map". For example, in one simple implementation, the location data is used to determine which of a plurality of zones or areas is applicable to the device at that time, and the parametric rule set associated with that area or zone to apply to operation of the wireless interface. More complex data structures may be used as well, such as where the input "location" information may be any one of a number of different types or formats (e.g., GPS coordinates, Wi-Fi AP ID, base station ID, zip code, state, city, etc.), and the structure can utilize any of the formats to identify the appropriate parametric rule set.

In yet other embodiments, servers may be utilized. For example, the wireless device may send data identifying or associated with a location (or regulatory domain, as discussed infra) to a network server; the server responds with the applicable parametric rule set (or information how to access it locally on the mobile device) for that location or regulatory domain.

In some embodiments, the parametric "set" (which may include as few as one parameter) may relate to any aspect related to wireless device operation, such as RF interface transmission, power management, as described in greater detail below.

At step 106 of the method 100, the wireless device adjusts one or more parameters or characteristics in response to receipt of the parametric rule set.

Figure 1A:
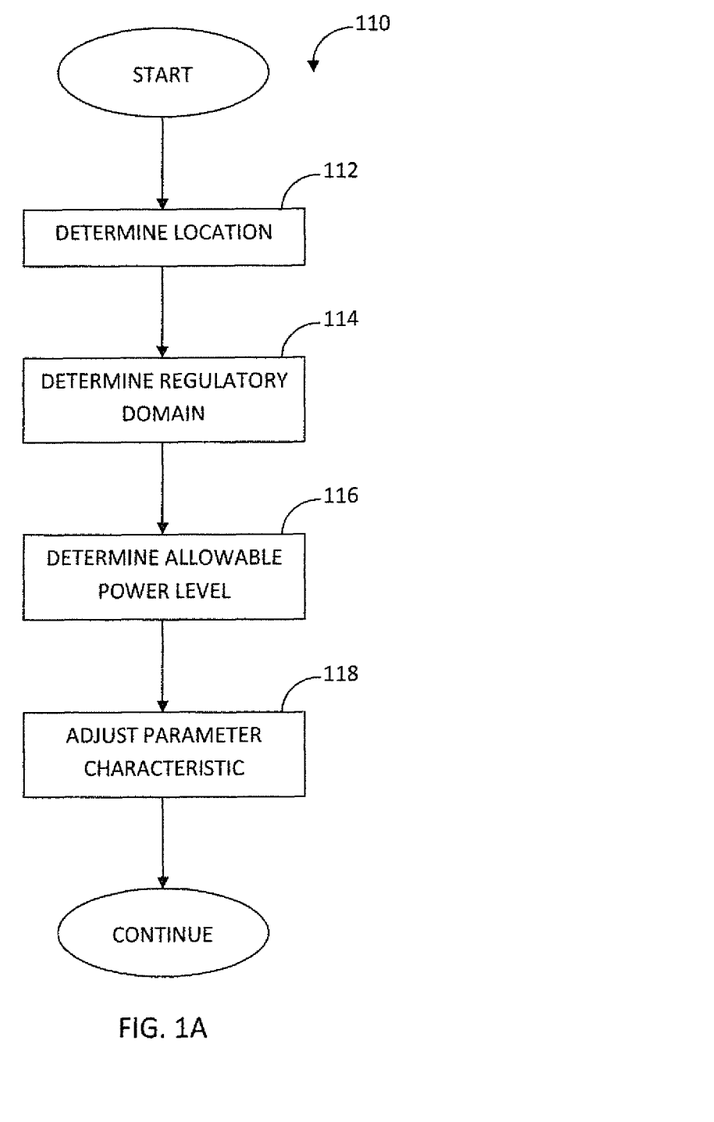
FIG. 1A is a logical flow diagram depicting a particular implementation of the generalized method of FIG. 1, wherein transmit power is controlled.

Referring now to FIG. 1A, one exemplary implementation of the generalized method of FIG. 1 is shown and described, wherein transmit power is controlled.

At step 112 of the method 110, the location of the location of the wireless device is determined, such as described above with respect to FIG. 1

Once the location of the device has been determined, the device uses the location to identify a regulatory domain associated with the location (step 114).

The location information obtained or provided by the device in step 112 may be coordinates, a jurisdiction (city, country, etc.), a region (mountain range, valley, portion of a country, etc.), or a network parameter (MAC address, IP address, etc.). In some embodiments, the location input is then referenced to a map (or database) to determine the applicable regulatory domain. The reference map may be locally stored on the device or the device may retrieve the map from a network data source. In other embodiments, the device may provide the location input to a server, such as via Wi-Fi or cellular (e.g., LTE or LTE-A) interface. The server then cross references the location input with stored data to determine the regulatory domain of the wireless device, and returns the information to the device, such as via the same wireless interface, or an alternate interface more optimized for downstream communication. For example, the information may be "piggybacked" on extant channels or within extant signaling or other messages routinely transmitted to the device by the host wireless network (e.g., AP, eNB, etc.).

In general, a regulatory domain is a large enough area that even rough location data is sufficient to identify it. Thus, a wide variety of location inputs or combination of location inputs may be used.

After determination of the regulatory domain, allowed levels for the transmission characteristics of the device may be determined (step 116). The identified regulatory domain is referenced to a database that lists all transmission level limits for at least the identified domain. In some embodiments, the regulatory domain level limit referencing may be performed by the device using a stored or downloaded database.

As noted above, network servers may be utilized in certain implementations. For example, the wireless device may send a signal identifying a regulatory domain to a network server and the server responds with the maximum allowable levels for that regulatory domain. Alternatively, the wireless device may simply send the location input to the server, the server then identifies the appropriate regulatory domain, and finally the server sends the maximum allowable limits rather than only identifying the domain for the wireless device. Similarly, the server may make the location estimate from a network parameter (base station ID, IP-address, etc.), perform all the intermediate steps and return the maximum allowable limits to the wireless device. In some variants, the wireless device requests such information from the server. In other variants, the server provides the information without a specific request from the wireless device (e.g. upon initiation of a connection to the Internet).

In some embodiments, these levels may relate to any aspect related to wireless transmission (e.g. allowed power, frequency, channel number, channel spacing, channel hopping rate/sequence, power spectrum, digital/analog transmission, coding scheme, multiple-input multiple-output operation, etc.). In other embodiments, the wireless device may be limited to reconfiguring a subset of these levels. Further, some options provided by a regulatory domain may be outside the scope of the technology used by the wireless device. For example, the U.S. provides for unlicensed usage in the ISM bands near 900 MHz, 2.4 GHz, and 5 GHz, but Wi-Fi technologies do not make use of the 900 MHz band. Therefore, a purely Wi-Fi device (or one operating at that time purely using its Wi-Fi interface) has no use for regulatory limits at 900 MHz. Thus, in some variants the wireless device ignores values that do not affect its associated technologies. In other variants, non-applicable values are not provided to the device rule enforcement logic; i.e., they are intelligently or selectively filtered by e.g., a network server, or logical process operating on the mobile device itself. In yet other variants, the wireless device specifically requests every (e.g., maximum) value it requires for configuration.

At step 118, the wireless device adjusts one or more transmission characteristics in response to receipt of the maximum allowed levels. In some implementations, the wireless device may immediately begin transmission at the maximum permissible levels.

In other embodiments, the receipt of the maximum permissible levels allows the wireless device more flexibility to adjust to conditions, which may lead to optimal performance. For example, a device that is experiencing a higher than normal bit-error-rate (BER) or other degraded performance metric may increase its transmitted power beyond a universally allowed level to attempt to overcome this deficiency (which may be assumed to relate in some capacity to a weak or degraded signal).

In another case, a device operating a universally allowed channel/band may experience high interference due to high utilization by other devices (e.g. channels that are widely allowed may be more likely to be designated for default use by multiple vendors/technologies). Thus, a wireless device may switch to a channel/band that is only locally allowed (or less widely allowed) to avoid congestion. In some variants, the wireless device adjusts its settings reactively to performance degradation (e.g. alters settings if a performance metric falls below a threshold). In other variants, the wireless device may proactively run diagnostics and/or interference level tests (e.g. total received power vs. received signal) to select a satisfactory or optimal channel.

In some embodiments, a group of wireless devices may alter their transmission characteristics based on the determination of the maximum allowed levels, such as via messaging or signaling between the devices, or a node in communication with each (e.g., a Wi-Fi access point). Coordination among wireless transmitters may also be limited by a regulatory domain. This may have bearing on networks using P2P applications, ad hoc networking, or a wireless network with a large number of repeaters. Thus, the allowed levels of each device in the group may be affected by its membership in the group. In some variants, the density of the group of devices may affect their individual allowed levels. For example, the location determination may assist in compliance in keeping repeater density below a given level. Further, repeaters in a low device-density area may be able to transmit at higher levels that those in areas of higher device densities.

It will be appreciated that, in some implementations, the exemplary methods 100, 110 described above (or other analogous methods) may be performed at startup of the device. In some variants, the device may perform periodic checks (e.g. after a period of time, upon wake up, upon base station change). It can also be appreciated that, the determination of whether to apply the method may itself be location-based. For example, co-owned and co-pending U.S. patent application Ser. No. 12/215,592, filed on Jun. 26, 2008 and entitled "APPARATUS AND METHODS FOR ENFORCEMENT OF POLICIES UPON A WIRELESS DEVICE", previously incorporated reference herein, presents methods and apparatus for location-based function or configuration of a mobile device. As discussed therein, the location of the mobile device serves as a trigger to changing its functional or operational settings. When the "trigger" criteria are met, the mobile device is instructed to implement the desired functional and/or operational changes ("policies"), such as via a communication from the base station to the mobile device. Once the user leaves the access point, or the trigger criteria are no longer met, the device is automatically restored to its previous mode (or a default or secondary mode).

It will also be appreciated that, in light of the present disclosure, some embodiments the wireless device may forgo transmitting on one or more wireless interfaces until the steps of method are complete. Thus, the device may avoid making non-complaint transmissions.

In other embodiments, the wireless device begins transmitting in a universally complaint (or multi-complaint) default mode, and then adjusts its transmission characteristics once the steps of the method are complete. In some such embodiments, the wireless device is dependent on data/parameters (e.g. IP-addresses, Wi-Fi-base location information, etc.) that the wireless device may only be able to obtain over the wireless interface it intends to configure. In other cases, the delay associated with implementation of the method (e.g. satellite location for GPS) increases device connection initiation times unduly. Thus, the wireless connection may be initiated in the default mode and adjusted once the regulatory domain is identified. These embodiments are also protected from periods of non-operation in the case that a determination of regulatory domain cannot be made.

Exemplary Wireless Device—

Figure 2:
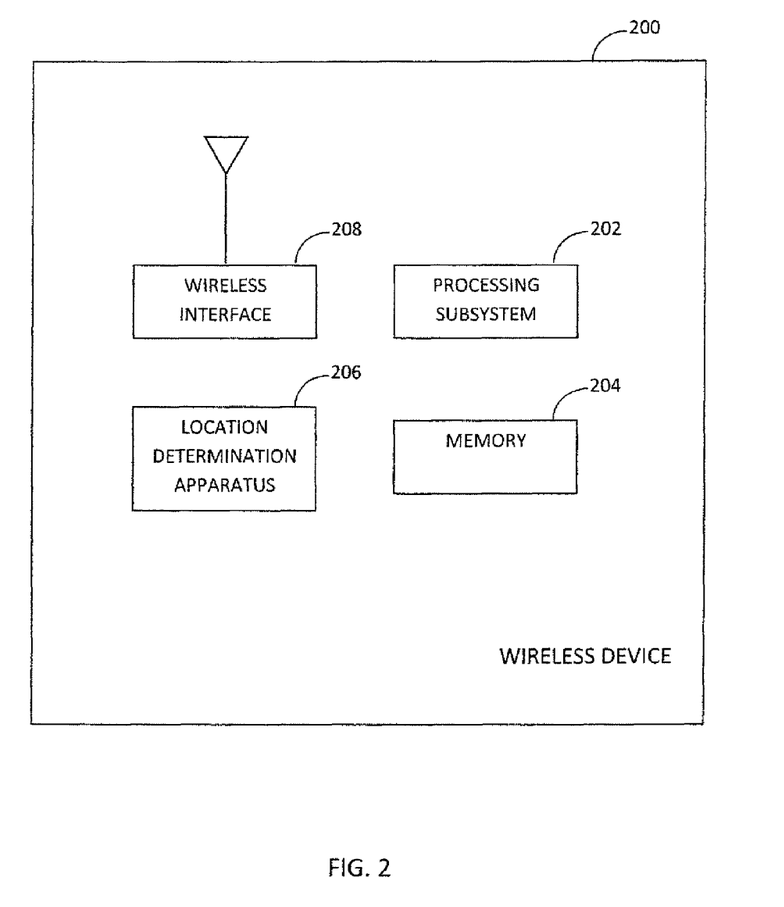
FIG. 2 is a functional block diagram of one embodiment of a wireless device configured according to various embodiments of the present disclosure.

Referring now to FIG. 2, an exemplary wireless device 200 configured for location-based parameter (e.g., RF transmission) or characteristic control is shown. As used herein, the term "wireless device" includes, but is not limited to cellular telephones, smartphones (such as for example an iPhone™ manufactured by the Assignee hereof), handheld or tablet computers, personal media devices (PMDs), wireless base stations, wireless access points, femtocells, or virtually any device with a wireless transmitter. While a specific device configuration and layout is shown and discussed, it is recognized that many other implementations may be readily implemented by one of ordinary skill given the present disclosure, the wireless device 200 of FIG. 2 being merely illustrative of the broader principles of the disclosure.

The processing subsystem 202 of the device 200 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 204, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown, the processing subsystem 202 includes discrete components; however, it is understood that in some embodiments they may be consolidated or fashioned in a SoC (system-on-chip) configuration. It can be appreciated that, one or more applications running on the processing subsystem may perform one or more of the steps discussed above with respect to FIGS. 1-1A of the present disclosure.

In some embodiments, the wireless device 200 may also include an apparatus for location determination 206. This may include for instance a set of integrated circuits and antennas (e.g. for GPS location, RF triangulation, etc.), or yet other mechanisms as previously described herein. It is appreciated, however, that in other embodiments no location determination apparatus is provided on the wireless device; rather, the device obtains its location information from an external source (which may or may not be associated with the wireless interface of concern regarding transmitter parameters). For instance, location information may come from a Wi-Fi AP, and the location information is used in the selection of an appropriate cellular (e.g., 3GPP or LTE) spectral mask.

The wireless device 200 further includes one or more wireless interfaces 208 which are configured to receive transmissions from a wireless network. The wireless interfaces may include virtually any wireless technology such as e.g., WLAN or WMAN networks (e.g. Wi-Fi-family, WiMAX, etc.), personal area networks (e.g. Bluetooth®, 802.15, etc.), or cellular (e.g. GSM, UMTS, CDMA, CDMA2000, WCDMA, EV-DO, 3GPP standards, LTE, LTE-A, EDGE, GPRS, HSPA, HSPA+, HSPDA, and/or HSPUA, etc.). In one exemplary embodiment, the wireless interface is a Wi-Fi family transceiver (802.11a, b, g, n, v, etc.) and includes a baseband processor.

In one such variant, the baseband processor is further configured for implementing the location-based parameter (e.g., transmission) or characteristic control methods or protocols described previously herein. In one implementation, the processor includes algorithms to request or determine a location, determine a regulatory domain, reference a database for the maximum allowed levels associated with the regulatory domain, and adjust the transmission characteristics of the wireless transceiver.

The following discussion provides exemplary operation of devices consistent with the present disclosure.

Example Operation No. 1

Figure 3:
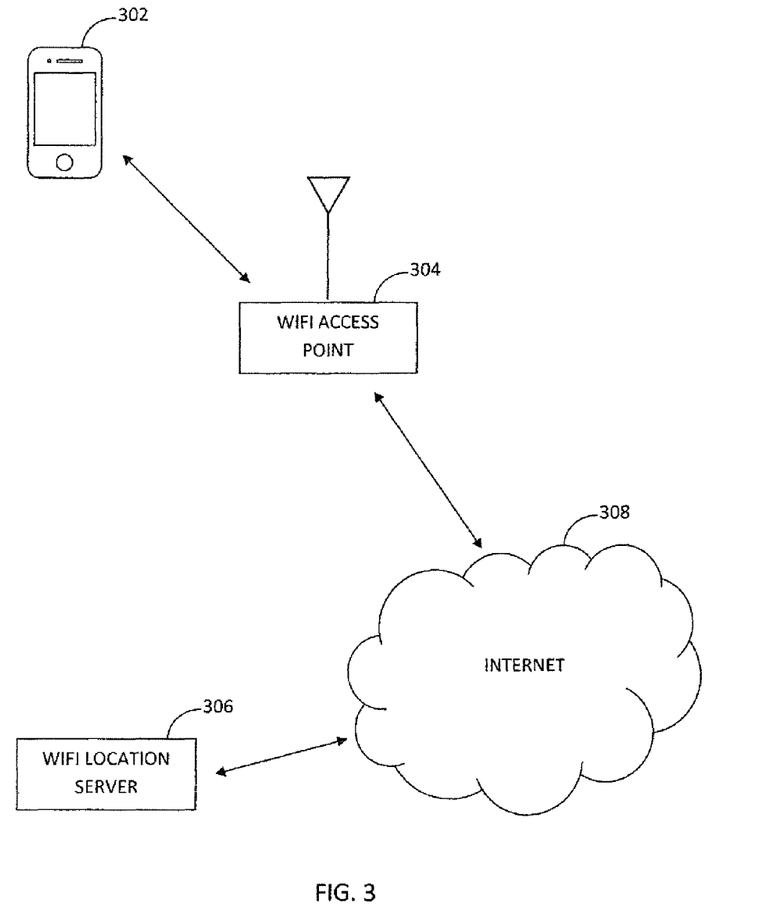
FIG. 3 is functional block diagram illustrating exemplary operation of one embodiment consistent with the present disclosure.

Referring now to FIG. 3, in one exemplary embodiment, the present disclosure pertains to a Wi-Fi enabled mobile device 302 establishing a connection to a Wi-Fi access point 304.

The Wi-Fi enabled mobile device 302 transmits a connection request to the access point 304 at a default transmit power level. The default power level is compliant with requirements across multiple regulatory domains.

The access point 304 responds affirmatively, and a WLAN (wireless local area network) connection is initiated between the mobile device 302 and the access point. Once connected, the mobile device forwards the MAC address (broadcast as a BSSID by Wi-Fi access points) of the access point to a Wi-Fi-location server 306 via the Internet 308 and requests a location.

The Wi-Fi-location server 306 includes a database of Wi-Fi access point locations organized by MAC-address. The Wi-Fi-location server responds to the MAC address based location request with a set of coordinates or other information associated with the location of the access point 304. Alternatively, if the Wi-Fi-location server was unable to find location data on the access point to which the mobile device 302 is connected, the mobile may instead send the MAC address of any other access point within range of the mobile device. Assuming that the MAC address is found and the coordinates are sent, the mobile device 302 has successfully determined its location.

Using the coordinate input, the mobile device 302 references its location to a mapping of coordinates into one or more regulatory domains. Thus, the device identifies the regulatory domain in which it is currently located.

Once the regulatory domain is identified, the device 302 references a locally stored library or other repository of maximum allowed transmit powers for various regulatory domains. Using the identified domain, the mobile device determines the maximum power at which it may currently legally transmit. The device adjusts it's transmit power limits accordingly.

At some later time, the WLAN connection between the access point 304 and the mobile device 302 degrades. In one such case, the user of the mobile device has moved farther from the access point. The access point reports an increased level of errors in transmission by the mobile device. The mobile device responds by increasing its transmitted signal power to a level in excess of that which would be consistent with the all of the regulatory domains in which it is approved for use, but which is allowed in the current regulatory domain.

Accordingly, the connection quality improves, and the reported errors are reduced. Thus, the performance of the mobile device 302 is increased.

Example Operation No. 2

Figure 4:
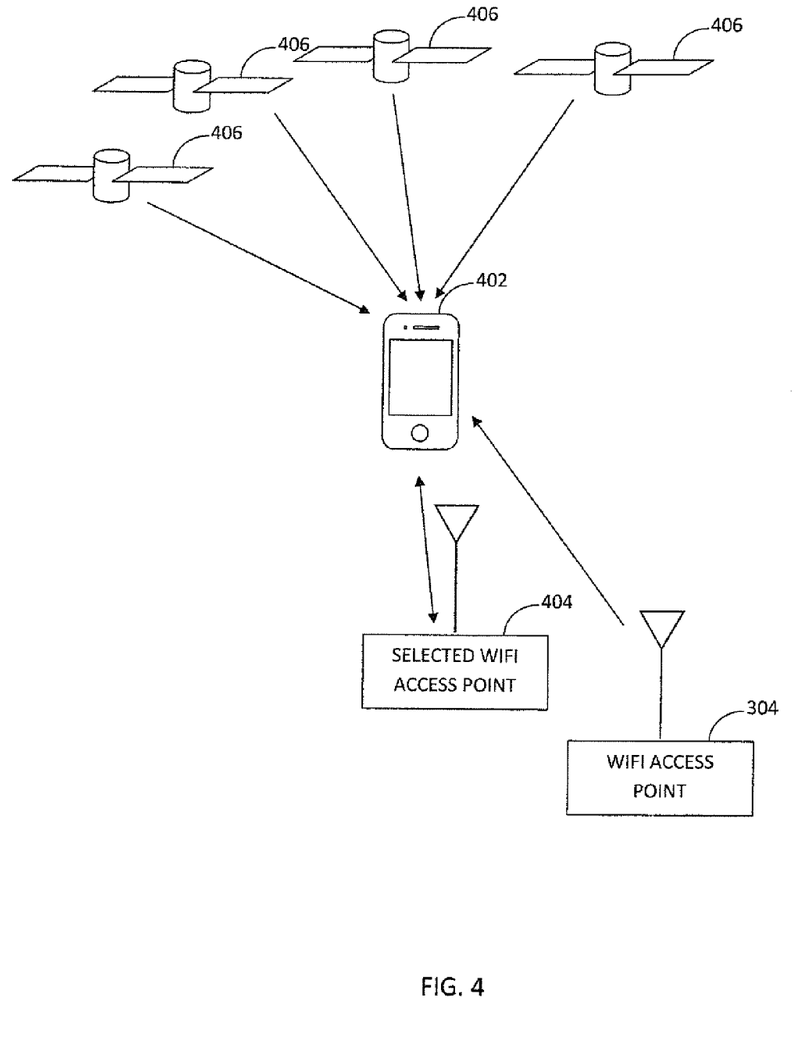
FIG. 4 is functional block diagram illustrating exemplary operation of another embodiment consistent with the present disclosure.

Referring now to FIG. 4, in another exemplary embodiment, the present disclosure pertains to a Wi-Fi-enabled mobile device 402 with UPS capabilities.

The mobile device 402 is powered on, and begins a passive (non-transmitting only receiving) search for Wi-Fi access points (304, 404). The device catalogs the access points in range, and determines there associated signal strengths. Unable to determine a default access point selection (e.g., the user is currently traveling), the mobile device presents the user with a selection of access point options based on its survey.

Also beginning at power on, the device 402 activates its GPS circuits and begins obtaining location-related data from satellites 406. Once a sufficient number of satellites are contacted, the GPS circuits produce a set of coordinate representing the location of the mobile device. The mobile device in one variant does not wait for a precise determination of its location, because a rough determination±10 km is sufficient for determination of the regulatory domain.

Using the location, the device 402 determines the regulatory domain using a locally stored mapping of regulatory domains vs. coordinates. The device references a locally stored library of maximum allowed transmission channels for various regulatory domains. Using the identified domain, the mobile device determines a set of channels on which it may currently legally transmit. The device sets its channel settings accordingly.

By this time, the user has selected a Wi-Fi access point 404. The device 402 connects to the access point on one of the identified legal channels. If the connection degrades at a future time (such as from outside interference), the mobile device may select a new channel with less activity from the identified set.

If the user had selected an access point 404 before the regulatory domain had been determined, the device 402 in one implementation delays connecting to the access point to avoid non-complaint transmissions. If a location could not be determined through automated means, the mobile device may instead prompt the user for input.

Example Operation No. 3

Figure 5:
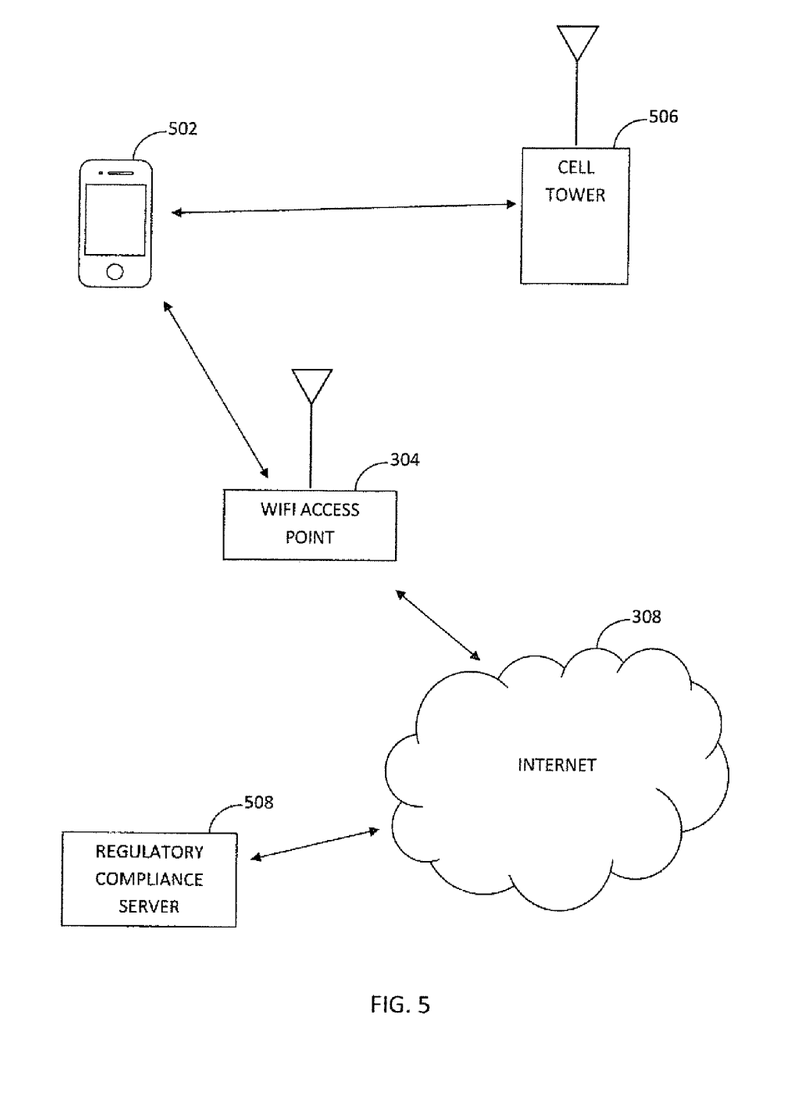
FIG. 5 is functional block diagram illustrating exemplary operation of yet another embodiment consistent with the present disclosure.

Referring now to FIG. 5, in yet another exemplary embodiment, the present disclosure pertains to a Wi-Fi-enabled mobile device 502 with an active digital cellular connection (e.g., a voice-only interface).

The mobile device retrieves a regional identifier from the cell tower 506 to which the mobile device 502 is connected. The regional identifier allows the mobile to determine it approximate location (i.e., the city in which the mobile device is currently located).

The Wi-Fi enabled mobile device 502 transmits a connection request to a Wi-Fi access point 304 at a default transmit power level. The default power level is complaint with requirements in multiple regulatory domains.

Once connected to the Wi-Fi access point 304, the mobile device 502 has data access. The mobile device knows its location, but lacks a mapping of regulatory domains and any listing of limits pertaining to a specific regulatory domain (the mobile device's locally stored default settings apply to multiple domains). Via the Internet 308 or another network/interface, the mobile device forwards its location information to a regulatory compliance server 508, and requests the allowed frequency bands and maximum transmit powers for each of these bands associated with the current location of the mobile device.

The regulatory compliance server 508 references the city identified by the mobile device 502 against a database of regulatory domains. Once the server identifies the regulatory domain of the mobile device, the server searches its database for the allowed bands and maximum powers. Once found, the server responds to the mobile device and, in addition to providing the requested regulatory limits, provides a suggested frequency band likely to be underutilized. The selection of the suggested band being based on the fact that the band is not allowed in many other regulatory domains, and thus, usage by other multi-domain compliant devices is likely to be low.

The device 502 switches its connection to the access point 304 to the suggested frequency band. The user of the mobile device experiences superior performance.

It will be appreciated that while the exemplary embodiments of the disclosure have been discussed primarily in terms of adhering to transmission rules for wireless transmitters in various regulatory domains, the principles described herein are in no way so limited. The concepts described herein may also be applied in other contexts. For example, the location determination used in the present embodiment may be extended to include an altitude measurement (i.e. a 3-D position determination). Using such an altitude determination, the wireless device is able to determine if the user is flying on an airplane, or in a high-rise or other natural or man-made structure/feature. In this example, the allowed behavior of the device on the airplane may not match the regulations that would be applicable if the user were on the ground at the same location. Cellular or other wireless usage may be banned on airplanes. In some embodiments, these position controls may be defaults that may be overridden to allow for general in-flight wireless usage or emergency calling in a crisis.

In the context of government regulation, certain applications or activities may be banned in certain jurisdictions. For example P2P sharing applications or wireless tethering applications may violate the laws of particular countries. In these cases, certain embodiments may be configured to block the offending applications from execution until the device is removed from the banning jurisdiction.

More generally, the disclosure may be applied in any circumstance in which the behavior of a device may be influenced or controlled by the location of the device.

It will be recognized that while certain principles are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features of the various embodiments, it will be understood that various omissions, substitutions, and changes in the form and details of the device or process illustrated may be made by those skilled in the art without departing from the present disclosure. The foregoing description is of the best mode. This description is in no way meant to be limiting, but rather should be taken as illustrative of the general principles of the disclosure. The scope of the principles described herein should be determined with reference to the claims.

What is claimed is:

1. A wireless device comprising:
   a processor;
   a wireless interface in data communication with the processor;
   a storage apparatus in data communication with the processor and configured to store a data library comprising a plurality of spectral masks;
   a location apparatus in data communication with the processor and configured to determine a location of the wireless device;
   logic in communication with the wireless interface and configured to adjust at least one transmit characteristic of the wireless interface based at least in part on a spectral mask associated with the location of the wireless device; and
   event detection logic, the event detection logic configured to:
      dynamically identify an occurrence of one or more events which are prospectively associated with a change in the location of the wireless device;
      determine a current location of the wireless device;
      determine based on the current location whether the wireless device should implement a new spectral mask; and
      when it is determined that the new spectral mask is required, invoke the logic in communication with the wireless interface and configured to adjust at least one transmit characteristic in accordance with the new spectral mask.

2. The wireless device of claim 1, wherein the at least one transmit characteristic comprises one or more frequency bands of transmission.

3. The wireless device of claim 2, wherein the at least one transmit characteristic further comprises transmission power.

4. A method for controlling an operational parameter of a wireless device, the method comprising:
   communicating with a first base station and, responsive to a handover to a second base station:
      determining when a location of the wireless device has changed;
      determining a current location of the wireless device; and
      determining based on the current location whether the wireless device should implement a new spectral mask; and
      when the implementation of the new spectral mask is determined, adjusting at least one transmit characteristic of the wireless device in accordance with the new spectral mask.

5. The method of claim 4, wherein the act of determining the current location comprises using a wireless receiver indigenous to the wireless device to determine the current location.

6. The method of claim 5, wherein the wireless receiver comprises a wireless local area network (WLAN)-enabled receiver, and the act of determining the location further comprises determining based on association of the wireless device with a known location of an access point or hotspot.

7. The method of claim 5, wherein the act of using the wireless receiver comprises using a satellite receiver.

8. The method of claim 5, wherein the adjusting the at least one transmit characteristic comprises changing one or more frequency bands of transmission.

9. The method of claim 5, wherein the adjusting the at least one transmit characteristic further comprises increasing or decreasing a transmission power.

10. The method of claim 4, wherein the handover to the second base station comprises handing over to a base station of a network operated by a different network operator.

11. The method of claim 4, wherein the handover to the second base station comprises transitioning from one radio access technology (RAT) to another RAT.

12. A wireless device comprising:
   a wireless interface; and
   logic in communication with the wireless interface and configured to:
      transfer the wireless device from one base station of a wireless network to another base station;
      determine when a location of the wireless device has changed;
      determine a new location of the wireless device;
      determine based on the new location whether to implement a new spectral mask at the wireless device; and
      adjust at least one transmit characteristic of the wireless interface based at least in part on the determination of the implementation of the new spectral mask.

13. The wireless device of claim 12, further comprising an apparatus configured to communicate with an entity other than the wireless device, the communication configured to receive a location-related data element configured to identify the new location of the wireless device that has been determined by the entity other than the wireless device.

14. The wireless device of claim 12, further comprising an apparatus configured to determine a location-related data element, wherein the location-related data element comprises a mobile network code (MNC), and the determination of the change in the location of the wireless device is based on a detection of a change in the MNC.

15. The wireless device of claim 12, further comprising an apparatus configured to determine a location-related data element, wherein the location-related data element comprises a mobile country code (MCC) and the determination of the change in the location of the wireless device is based on a detection of a change in the MCC.

16. The wireless device of claim 12, wherein the logic in communication with the wireless interface is further configured to prompt a user of the wireless device to provide information about the location of the wireless device.

17. A computer-readable storage apparatus comprising a non-transitory storage medium having at least one computer program stored thereon, the at least one program being configured to, when executed, cause a processor to:
transfer a wireless mobile device from one base station of a wireless network with which the wireless mobile device is in communication, to another base station;
determine that a location of the wireless mobile device has changed;
determine a current location of the wireless mobile device;
determine based on the current location whether the wireless mobile device should implement a new spectral mask; and
when the wireless mobile device implements a new spectral mask, adjust at least one transmit characteristic of a wireless interface of the wireless mobile device.

18. The computer-readable storage apparatus of claim 17, wherein the at least one transmit characteristic comprises a transmit power.

19. The computer-readable storage apparatus of claim 17, wherein the location of the wireless mobile device is obtained from a transmission received from the one base station of the wireless network with which the wireless mobile device is in data communication.

20. The computer-readable storage apparatus of claim 17, wherein the location of the wireless mobile device is obtained from a global positioning system (GPS) receiver of the wireless mobile device.

* * * * *